US011743515B1

(12) United States Patent
Gravino et al.

(10) Patent No.: US 11,743,515 B1
(45) Date of Patent: Aug. 29, 2023

(54) SUBSTITUTION OF ITEMS IN A CENTRAL VIDEO LIBRARY FOR PERSONALLY RECORDED VIDEO CONTENT

(71) Applicant: Cox Communications, Inc., Atlanta, GA (US)

(72) Inventors: Douglas D. Gravino, Roswell, GA (US); Mark Matthew Gathen, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/928,330

(22) Filed: Jun. 26, 2013

Related U.S. Application Data

(60) Provisional application No. 61/784,599, filed on Mar. 14, 2013.

(51) Int. Cl.
| | |
|---|---|
| *H04N 21/234* | (2011.01) |
| *H04N 21/2668* | (2011.01) |
| *H04N 21/433* | (2011.01) |
| *H04N 21/45* | (2011.01) |
| *H04N 21/81* | (2011.01) |
| *H04N 5/272* | (2006.01) |

(52) U.S. Cl.
CPC ....... *H04N 21/23418* (2013.01); *H04N 5/2723* (2013.01); *H04N 21/812* (2013.01); *H04N 21/2668* (2013.01); *H04N 21/4331* (2013.01); *H04N 21/4532* (2013.01)

(58) Field of Classification Search
CPC .............. H04N 5/2723; H04N 21/2668; H04N 21/4331; H04N 21/4532; H04N 21/812
See application file for complete search history.

(56) References Cited

U.S. PATENT DOCUMENTS

| 8,275,245 | B2* | 9/2012 | Amsterdam et al. ........ 386/294 |
| 9,014,540 | B1* | 4/2015 | Cholas et al. ........ H04N 21/258 |
| | | | 386/240 |
| 2002/0092021 | A1* | 7/2002 | Yap et al. ...................... 725/55 |
| 2006/0218601 | A1* | 9/2006 | Michel ......................... 725/087 |
| 2008/0059884 | A1* | 3/2008 | Ellis et al. ................... 715/721 |
| 2008/0141317 | A1* | 6/2008 | Radloff et al. ..... H04N 5/44582 |
| | | | 725/87 |

(Continued)

OTHER PUBLICATIONS

AT&T U-verse Support, Uverse.com: Live TV, shows, movies, music, sports, and more, Printed Jun. 19, 2013. 1 pgs. www.att.com/esupport/article.jsp?sid=KB401143&cv=803&_sm_au_=iVVPZqRS6rKk0MJP#fbid=CU3WGINJIqy.

*Primary Examiner* — James R Marandi
(74) *Attorney, Agent, or Firm* — Merchant & Gould P.C.

(57) ABSTRACT

Substituting video on demand (VOD) content items for video content recorded onto a digital video recorder (DVR) or selected to be recorded onto a DVR is provided. Oftentimes, there is overlap between content that a user has recorded on his DVR or is selecting to record onto his DVR and video content that is available in a VOD library. When a user selects to record video content, selects to play recorded content, when a storage space reaches a predetermined capacity, or according to a predetermined time interval, a query may be performed to search for VOD content items that match recorded content or content selected to be recorded. If a match is found, the VOD content item may be substituted for the DVR recording. When a user selects to playback the content, the content may be streamed from the VOD library. Advertising may also be inserted.

20 Claims, 5 Drawing Sheets

(56) References Cited

U.S. PATENT DOCUMENTS

| | | | |
|---|---|---|---|
| 2010/0284668 A1* | 11/2010 | Knight ................. | H04N 5/765 |
| | | | 386/248 |
| 2011/0052157 A1* | 3/2011 | Pickelsimer et al. ........ | 386/295 |
| 2012/0204215 A1* | 8/2012 | Hayashi et al. ................ | 725/88 |
| 2013/0227608 A1* | 8/2013 | Evans et al. ................... | 725/35 |
| 2014/0129669 A1* | 5/2014 | Wiseman et al. . | G06F 15/17306 |
| | | | 709/217 |
| 2014/0181868 A1* | 6/2014 | O'Callaghan ...... | H04N 21/4821 |
| | | | 725/39 |

\* cited by examiner

SUBSTITUTION OF ITEMS IN A CENTRAL VIDEO LIBRARY FOR PERSONALLY RECORDED VIDEO CONTENT

CROSS REFERENCE TO RELATED APPLICATIONS

The present application claims priority to U.S. Provisional Pat. Application No. 61/784,599 titled "Substitution of items in a Central Video Library for Personally Recorded Video Content" filed Mar. 14, 2013, the disclosure of which is hereby incorporated by reference in its entirety.

BACKGROUND

Video consumers are increasingly utilizing digital video recorders (DVRs, also known as "personal video recorders", or PVRs) to record video content for later viewing. As customers habitually use their DVRs to record more and more programs and as that content is now more often in high definition (HD) and the recorded files are larger, space management of the recorded content on the local hard drives has become an issue. "No space available for recording" is becoming a commonly seen error message, and companies providing DVRs are having to create new hardware models with larger hard drives. Oftentimes, users select to record lower quality standard definition (SD) video on a DVR despite HD video of the same program being available in order to save the additional space. As can also be appreciated, space management of recorded content on network-based DVR systems is also a problem. Accordingly, content providers may be required to allocate more servers and storage space to provide for recorded content.

At the same time, however, video service providers such as multiple services operators (MSOs), telephone companies (telcos), or satellite television (TV) providers have been creating larger and larger centralized video-on-demand (VOD) libraries, and are commonly acquiring new episodes of video content as quickly as the next morning after an episode airs on evening primetime. Frequently, the next-day VOD episodes are popular and highly rated TV programs and are supplied in HD format. As such, there is a high degree of overlap between the content that consumers are recording on their DVRs and the content that is available hours later in their service provider's VOD library.

It is with respect to these and other considerations that the present invention has been made.

SUMMARY

Embodiments of the present invention provide substitution of VOD content for digital video recorded content. Embodiments may comprise a system and method for utilizing overlap between the content that users are likely to program their DVR to record and the content that either already exists or will soon exist in a VOD library. By substituting the content in a central VOD library for content that a user would or may have already recorded using their DVR, the user may be able to more efficiently utilize recording space and potentially have a better viewing experience by seeing higher quality (HD) content from the VOD system. According to an embodiment, the above substitution may be implemented without any further user input.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF DRAWINGS

Referring now to the drawings in which like reference numbers represent corresponding parts throughout.

DETAILED DESCRIPTION

Figure 1:
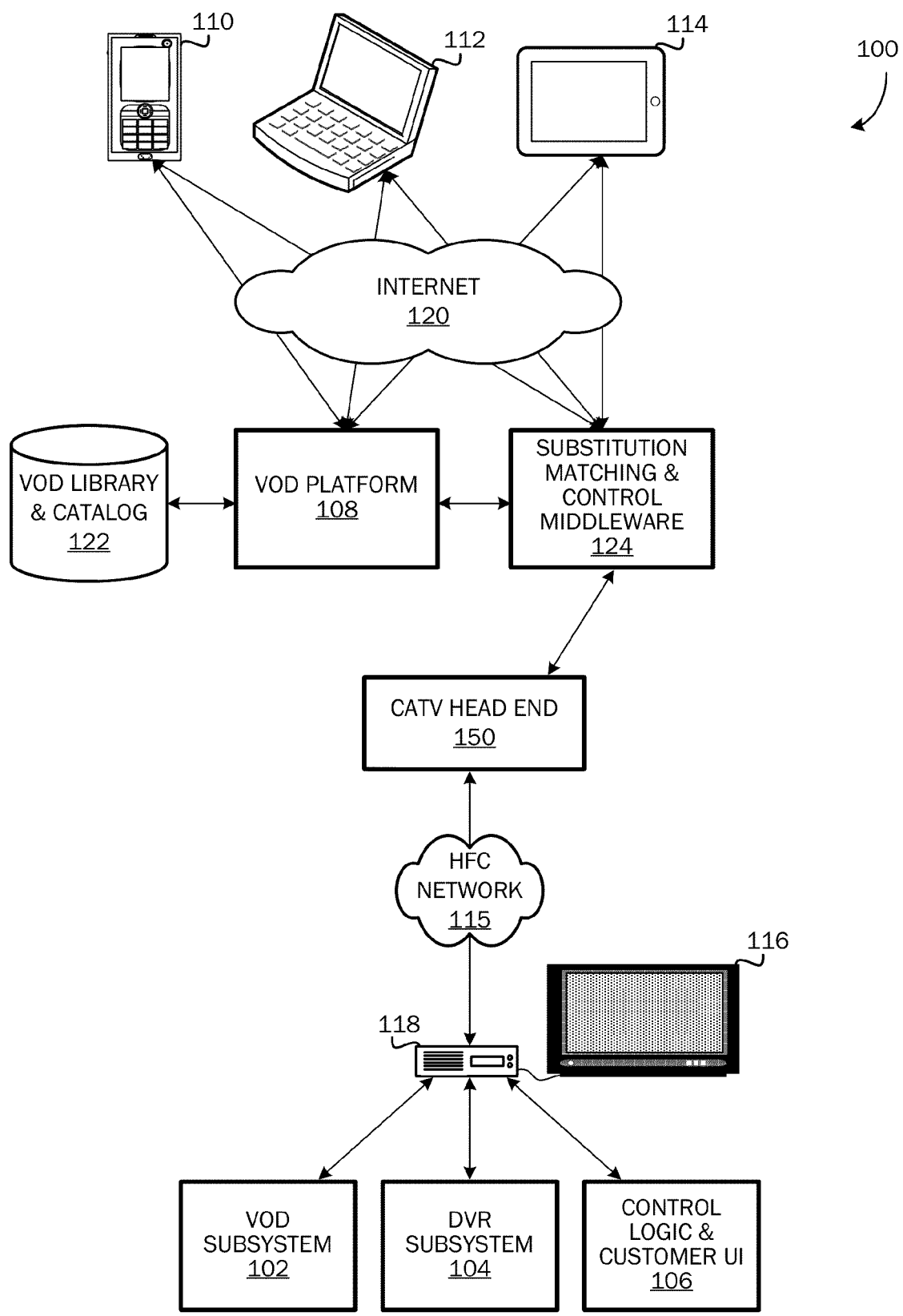
FIG. 1 is a simplified block diagram illustrating a system for providing substitution of VOD content for digital video recorded content.

Embodiments provide for substitution of VOD content for digital video recorded content. Currently, at any given time, millions of households may be recording a same television program simultaneously for later viewing. These millions of copies on individual hard drives must be stored, managed, deleted, etc. by the individual consumers who record them. On the other hand, a single copy of the same television program in a centralized VOD system may be streamed to the households using existing technology, which may be more efficient, save recording space on individual DVRs and network DVRs, and may save needless effort.

From an advertising perspective, broadcast television typically has very broadly targeted and often time-sensitive ads. When a DVR recording of broadcast television containing such ads is viewed at a later date, for example, days or weeks later, the time-relevancy of those ads may be lost (e.g., ads for upcoming TV shows that are now in the past, ads for holiday sales that are now over, etc.). Additionally, viewership measurement data associated with advertisements may be valid for a specified time period after airing. Therefore, if a DVR recording is viewed after the specified time period, the viewership measurement data associated with advertisements in the recording may be of little to no value. According to embodiments of the present invention, VOD platforms may have an ability to dynamically insert targeted advertisements at a time of playback. Accordingly, substituting VOD content for DVR content may allow a consumer to be served with more relevant, targeted advertising. Additionally, dynamic advertisement insertion in substituted VOD content may extend the value of viewership measurement data.

These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents. Referring now to the drawings, in which like numerals refer to like elements throughout the several figures, embodiments of the present invention and an exemplary operating environment will be described.

Referring now to FIG. 1, a simplified block diagram illustrating a system 100 for providing substitution of VOD content for digital video recorded content is shown. The system 100 may comprise various system-level and user-level components. User-level components may include a customer set-top box (STB) 118 connected to a television 116 used to display video content output of the STB 118. According to embodiments, the STB 118 may comprise a VOD subsystem 102, which may contain control logic, a user interface, and communications interfaces to communicate with a VOD platform 108 and to perform such actions as retrieve listings of content items in a VOD catalog 122 for presentation to a user, control playback of video content, etc. According to an embodiment, when substituting VOD content, the VOD subsystem 102 may interact with a DVR subsystem 104 to retrieve and play any VOD items that may be substituted for DVR content. "Virtual playback" of DVR content may be played on an alternate device (such as a mobile phone 110, a computer 112, a tablet 114, an Internet television, etc.) by substituting VOD content for the original DVR content. VOD content associated with content on a user's DVR list may be transcoded and played on multiple alternate devices outside the user's home. Therefore, users may be enabled to take DVR recordings with them while on-the-go. According to an embodiment, a user's DVR recordings list may include titles of assets recorded onto the user's DVR hard drive and titles of VOD items substituted for DVR content. The DVR recordings list may be synched with information associated with whether the assets in the DVR recordings list may be available for download-to-go via a mobile device (e.g., mobile phones, laptops, tablets, etc.). If an asset matches a download-to-go asset item, an indication may be provided to the user notifying him that the asset can be downloaded and taken with him on-the-go. Not all assets may be available for a download-to-go option. Accordingly, providing an indication to a user may help the user to understand that he may complete the download via his mobile device.

The STB 118 may comprise a DVR subsystem 104. The DVR subsystem 104 may contain logic and storage for recording television programming and to play back the recorded content when requested by a user. According to an embodiment, the DVR subsystem 104 may perform VOD content substitutions or may communicate with a middleware server that controls substitutions. The DVR subsystem 104 may also interact with the VOD subsystem 102 for display of VOD content that is substituted for DVR content.

The STB 118 may also comprise control logic and a customer user interface 106, which may control STB 118 functionality, provide user messaging, etc. According to an embodiment, the control logic and customer user interface 106 may interact with the DVR subsystem 104 for user configuration and control.

The system 100 may comprise various system level components, which may include one or more VOD platform(s) 108, wherein a VOD platform 108 is a system which may hold a library 122 of episodic television content, movies, and other video-related assets which customers may select to view at any time. The content may be distributed over switched digital video channels or via Internet Protocol (IP).

The system 100 may also comprise a substitution matching and control middleware (SMCM) 124. The SMCM 124 may be an optional component that may be may be used to control a personalized channel system. The SMCM 124 may be operable to retrieve recommendations for users and issue remote tuning commands to subscriber STBs 118 (which may include either normal channel tuning, VOD playback, or DVR playback) along with other relevant data.

According to another embodiment, a centralized control system may be provided for controlling creation of personalized virtual channels of content. A centralized control system may include a system-level SMCM 124. According to this embodiment, matching steps, business rules, and other functions that will be described below with respect to a flow chart illustrated in FIG. 2 may be managed and computed centrally, while a STB 118 may be utilized for user input and output. A centralized control system may allow substitution of VOD content for DVR content for older STBs 118, which may have minimal processing power and may be outdated. Users with older STBs 118 may be able to create a DVR-like playlist with VOD content. As content becomes available, for example, the next day after a program is broadcast, the content may be added to a listing of available content from which the users may choose. According to another embodiment, a localized control system may be provided. In a localized control system, a centralized system controller may or may not be included. Local control logic 106, a DVR subsystem 104, and a VOD subsystem 102 associated with each STB 118 may be enhanced to perform functions of matching content, applying business rules, etc., for implementing content substitution. The local logic 106 may also handle extra features, such as user-level messaging, requesting custom ads, etc. Using a localized control system may utilize the CPU power of newer STBs 118 to handle local control functions, while only minimal changes may need to be made to legacy head-end 150 equipment.

According to another embodiment, a hybrid system, which may be a combination of one or more components of the above system, may be provided. As can be appreciated, a system for substituting VOD content for DVR content may be implemented in various ways without detracting from the fundamental ideas and steps.

Figure 2:
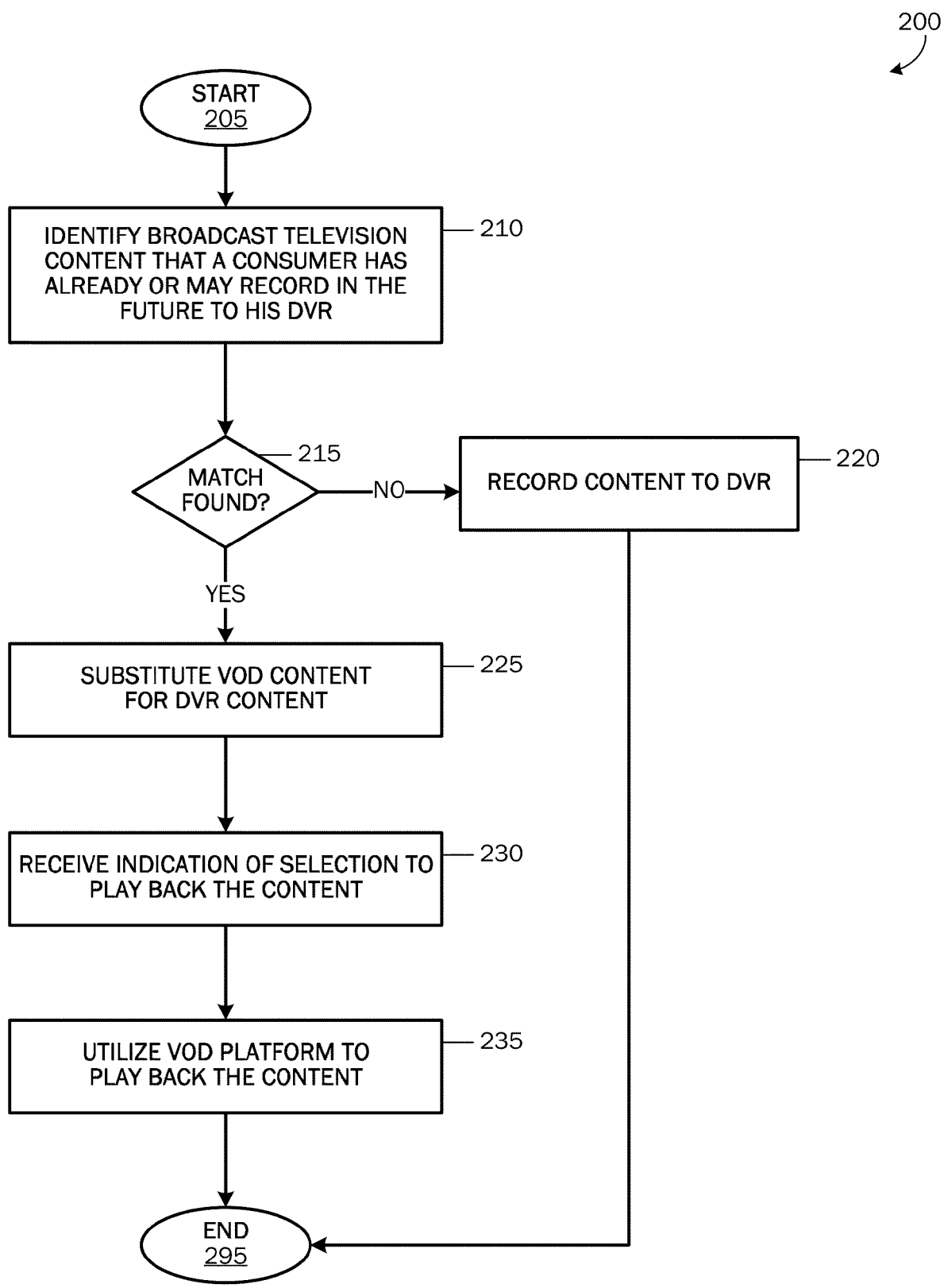
FIG. 2 is a flow chart of a method for automatically providing substitution of VOD content for digital video recorded content according to an embodiment.

Having described a system architecture 100, FIG. 2 is a flow chart of a method for providing substitution of VOD content for digital video recorded content according to an embodiment. The method 200 may begin at START OPERATION 205, and may proceed to OPERATION 210, where a piece of broadcast television content that a user has already or may in the future record to his DVR may be identified in an attempt to match the content with a corresponding piece of VOD content.

OPERATION 210 may be performed not only for content that is currently in the VOD platform 108, but also for content that is scheduled to be delivered to the platform 108 in the near future. According to an embodiment, the "corresponding piece of VOD content" relating to a future airing of a program may comprise of the actual video content or may comprise of a knowledge that the VOD asset may be available later. For example, if a new episode of a television program is scheduled to air, the actual video may not yet be available on the VOD platform; however, but it may be known that the new episode will be available as a VOD asset the day after it is aired. Accordingly, the asset may be identified as a possible match.

OPERATION 210 may involve matching video asset metadata across different sources and platforms, e.g. the DVR subsystem 104 communicating with the VOD platform 108 or a middleware platform 124 to attempt to make the match. Standard identifiers or matching tables may be utilized to allow for matching a piece of video content with a corresponding piece of VOD content.

Performing the match and starting the substitution process may occur at various times and multiple times throughout the life of a particular show (i.e., video content) in a DVR subsystem 104. For example, OPERATION 210 may be performed each time a consumer sets up a DVR recording. Alternatively, OPERATION 210 may be performed daily (e.g., every morning to look for already recorded content that may be substituted to reclaim space). According to an embodiment, a configuration may be provided, which when selected, may provide for detecting if an HD version of a DVR recording may be available. If an HD version is available, the program title of the recording may remain displayed in a listing of DVR recorded content. As another example, OPERATION 210 may be performed upon receiving an indication of a selection to play back DVR recorded content or when storage space of a DVR reaches a predetermined capacity.

OPERATION 210 may also be performed for a "deleted items" or a "failed recordings" folder in the DVR subsystem 104 as a way for users to virtually retrieve non-existent DVR items. According to embodiments, the match and substitution process may be applied to recommended or suggested programs for a user to watch. For example, if the user forgets to record a program he typically watches and if the program exists in the VOD library 122, the system could offer to provide the forgotten recording from VOD.

The method may proceed to DECISION OPERATION 215, where a determination may be made as to whether a match is found. If a match is not found, the method 200 may proceed to OPERATION 220, where content may be recorded to the user's local DVR or to a network-based DVR. If a match is found at DECISION OPERATION 215, the method 200 may proceed to OPERATION 225, where the VOD content may be substituted.

According to an embodiment, the DVR system 104 may create or modify a record, indicating that a particular program is not a "normal" DVR recording, but instead, is a VOD substitution. This may allow the DVR platform 104 to take appropriate actions to allow playback to occur properly. For example, if a desired DVR "recording" is being provided as a VOD substitution, the DVR system 104 may not allow playback to occur during a time window between the original broadcast time and when the VOD asset is actually received. According to an embodiment, there may be times when the DVR system 104 may not create or modify a record to indicate that a particular program is a VOD substitution. For example, the "create a record" step may not apply if OPERATIONS 210, 215, and 220 are performed immediately before playback of the content so that an HD version from the VOD library 122 can be substituted for an SD recording. In this case, the "create a record" step may be bypassed.

A decision may be made at OPERATION 225 as to whether or not to make the substitution. As can be appreciated, it may not be likely that each program in all timeslots on every channel of a broadcast television service may have a corresponding VOD asset. Accordingly, some items may not be substituted. For items where a corresponding VOD asset does (or will) exist, the system may either automatically make the substitution decision based on a rules engine (with some rules potentially based on user behavior or user configurations/settings) or may prompt a user whether he wishes to make the substitution.

Despite the space-saving potential of using VOD substitution, there are cases where it may be less advantageous for a user to make the substitution. For example, if the user wants to record a program airing at 7 pm so that he can watch it when he gets home late from work at 8 pm, he may not want to make the substitution since the VOD asset will not arrive until the following morning. According to an embodiment, the system may intercept "series recording" requests that instruct a DVR to record all episodes of a series. A user may be asked instead if he wishes to substitute VOD content for future episodes. If a DVR recording is deleted and replaced with a VOD asset, this may be circumvented.

Embodiments may be utilized with alternate devices (e.g., a mobile phone 110, a computer 112, a tablet 114, an Internet television, etc.). DVR content may be provided to an alternate device without moving the recorded program data from the DVR to the alternative device. If the alternate device is able to access the VOD system 108, the alternate device may be used for "virtual DVR playback" to view any VOD content that matches with what is recorded on the user's DVR. In this embodiment, OPERATIONS 205, 210, and 215 may utilize software on the alternate device to query the DVR platform 104 for what recordings have been made, and then attempt to match those recordings to VOD content. According to embodiments, the query and match function may be performed on the alternate device itself or on the middleware system 124. If such matches are found, then the matched items may be available for playback on the alternate device. With current systems, video content recorded on current generation DVRs may not be typically intended for playback on alternate devices (e.g., a mobile phone 110, a computer 112, a tablet 114, an Internet television, etc.) without computationally intensive transcoding and time-consuming data transfer. Therefore, providing a substitution of VOD content for DVR content on an alternate device provides an advantage over current systems.

At OPERATION 230, an indication of a selection to play back a substituted program may be received. For example, a user may select a program to watch from a DVR menu or user interface.

At OPERATION 235, the DVR system 104 may utilize the VOD platform 108 to play back the content. According to embodiments, although the substituted "recording" may appear in the DVR interface, the DVR system 104 may communicate with the VOD system 108 (or indirectly through the middleware platform 124) to play back a substituted piece of content from the VOD library 122. The DVR system 104 may invoke the VOD system 108 to play back the particular content item. OPERATION 235 may also include the optional insertion of replacement advertising. Once the user selects the content and the VOD asset is played, the item may remain listed in the DVR menu until the user removes it or until the VOD asset's license window ends.

According to embodiments, user management of substituted assets may be performed. That is, a user may manage his substituted content and the record created at OPERATION 220. Traditional DVR management tasks may be extended to properly handle substituted content in an integrated manner. These tasks may include "deleting" an item from a list of recorded programs (which in the case of substituted content means removing the record created at OPERATION 220, but not deleting the master copy in the VOD library 122), marking an item as "watched", looking at program information on a piece of substituted content (recorded on date x with program duration y), etc. Management steps may also include actions specific to content substitution, such as configuration of the rules used in OPERATION 220 to determine whether to automatically substitute certain content, etc. The method 200 may end at OPERATION 295.

Figure 3:
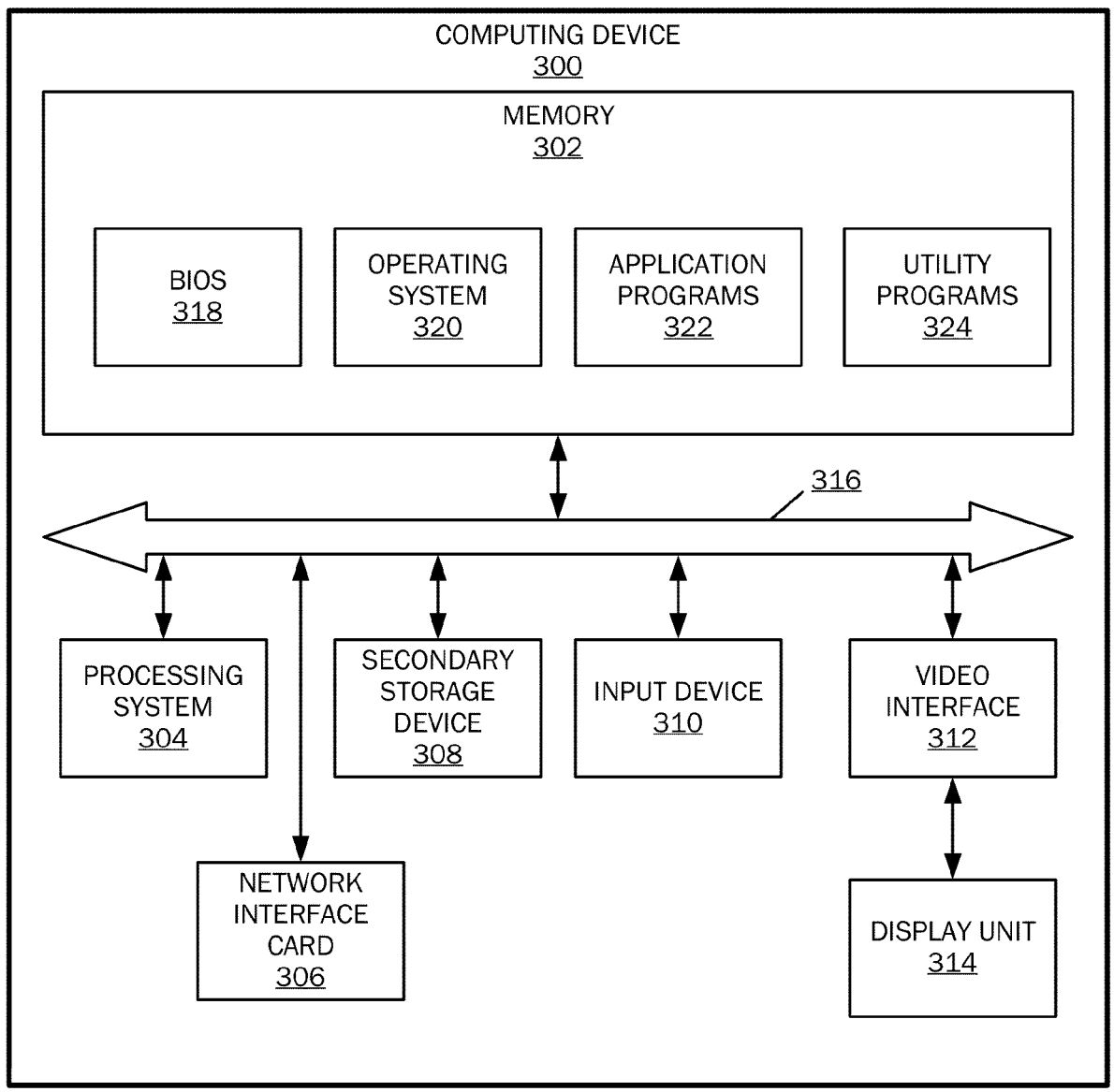
FIG. 3 is a block diagram illustrating example physical components of a computing device with which embodiments may be practiced.

FIG. 3 is a block diagram illustrating example physical components of a computing device 300 with which embodiments may be practiced. In some embodiments, one or a combination of the components of the substitution matching and control system 100 may be implemented using one or more computing devices like the computing device 300. It should be appreciated that in other embodiments, one or a combination of the components of the substitution matching and control system 100 may be implemented using computing devices having hardware components other than those illustrated in the example of FIG. 3.

Computing devices may be implemented in different ways in different embodiments. For instance, in the example of FIG. 3, the computing device includes a processing system 304, memory 302, a network interface 306, a secondary storage device 308, an input device 310, a video interface 312, a display unit 314, and a communication medium 316. In other embodiments, the computing device 300 may be implemented using more or fewer hardware components (e.g., a video interface, a display unit, or an input device) or in combination with other types of computer systems and program modules. The memory 302 includes one or more computer-readable media. According to one embodiment, the VOD subsystem 102, the DVR subsystem 104, and the control logic & customer UI 106 may be stored locally on computing device 300. Memory 302 thus may store the computer-executable instructions that, when executed by processor 304, provide substituted VOD content as described above with reference to FIGS. 1-2.

In various embodiments, the memory 302 is implemented in various ways. For example, the memory 302 can be implemented as various types of computer-readable media. According to embodiments, the term computer-readable media includes two different types of media including communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The processing system 304 includes one or more processing units, which may include tangible integrated circuits that selectively execute computer-executable instructions. In various embodiments, the processing units in the processing system 304 are implemented in various ways. For example, the processing units in the processing system 304 can be implemented as one or more processing cores. In this example, the processing system 304 can comprise one or more Intel Core microprocessors. In another example, the processing system 304 can comprise one or more separate microprocessors. In yet another example embodiment, the processing system 304 can comprise Application-Specific integrated Circuits (ASICs) that provide specific functionality. In yet another example, the processing system 304 provides specific functionality by using an ASIC and by executing computer-executable instructions.

The computing device 300 may be enabled to send data to and receive data from a communication network via a network interface card 306. In different embodiments, the network interface card 306 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 308 includes one or more computer-readable storage media, and may store data and computer-executable instructions not directly accessible by the processing system 304. That is, the processing system 304 performs an I/O operation to retrieve data and/or computer-executable instructions from the secondary storage device 308. In various embodiments, the secondary storage device 308 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 310 enables the computing device 300 to receive input from a user. Example types of input devices include, but are not limited to, keyboards, mice, trackballs, stylus input devices, key pads, microphones, joysticks, touch-sensitive display screens, and other types of devices that provide user input to the computing device 300.

The video interface 312 outputs video information to the display unit 314. In different embodiments, the video interface 312 is implemented in different ways. For example, the video interface 312 is a video expansion card. In another example, the video interface 312 is integrated into a motherboard of the computing device 300. In various embodiments, the display unit 314 can be a an LCD display panel, a touch-sensitive display panel, an LED screen, a projector, a cathode-ray tube display, or another type of display unit. In various embodiments, the video interface 312 communicates with the display unit 314 in various ways. For example, the video interface 312 can communicate with the display unit 314 via a Universal Serial Bus (USB) connector, a VGA connector, a digital visual interface (DVI) connector, an S-Video connector, a High-Definition Multimedia interface (HDMI) interface, a DisplayPort connector, or another type of connection.

The communications medium 316 facilitates communication among the hardware components of the computing device 300. In different embodiments, the communications medium 316 facilitates communication among different components of the computing device 300. For instance, in the example of FIG. 3, the communications medium 316 facilitates communication among the memory 302, the processing system 304, the network interface card 306, the secondary storage device 308, the input device 310, and the video interface 312. In different embodiments, the communications medium 316 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system interface (SCSI) interface, or another type of communications medium.

The memory 302 stores various types of data and/or software instructions. For instance, in the example of FIG. 3, the memory 302 stores a Basic Input/Output System (BIOS) 318, and an operating system 320. The BIOS 318 includes a set of software instructions that, when executed by the processing system 304, cause the computing device 300 to boot up. The operating system 320 includes a set of software instructions that, when executed by the processing system 304, cause the computing device 300 to provide an operating system that coordinates the activities and sharing of resources of the computing device 300. The memory 302 also stores one or more application programs 322 that, when executed by the processing system 304, cause the computing device 300 to provide applications to users, for example, one or more components of the substitution matching and control system 100. The memory 302 also stores one or more utility programs 324 that, when executed by the processing system 304, cause the computing device 300 to provide utilities to other software programs. Embodiments of the present invention may be utilized in various distributed computing environments where tasks are performed by remote processing devices that are linked through a communications network in a distributed computing environment.

Figure 4:
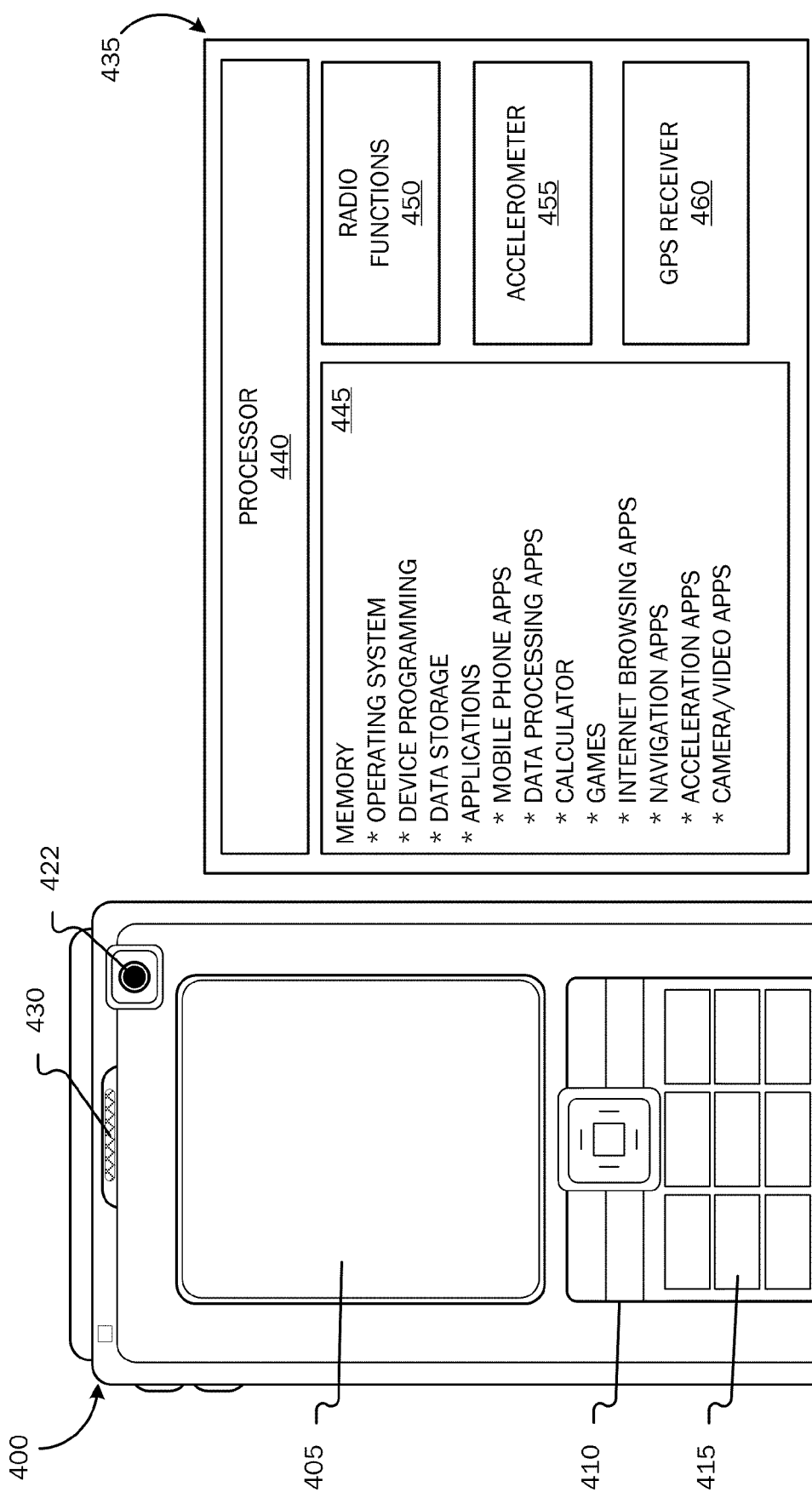
FIGS. 4A-4B illustrate a suitable mobile computing environment with which embodiments may be practiced.

FIGS. 4A-4B illustrate a suitable mobile computing environment, for example, a mobile computing device 400, a mobile phone 110, a tablet personal computer 114, a laptop computer 112, and the like, with which embodiments may be practiced. The mobile computing device 400 is illustrative of any suitable device operative to send, receive and process wireless communications according to embodiments of the present invention. A display screen 405 is operative for displaying a variety of information such as information about incoming and outgoing communications, as well as, a variety of data and displayable objects, for example, text, alphanumeric data, photographs, and the like.

Data input to the device 400 may be performed via a variety of suitable means, such as, touch screen input via the display screen 405, keyboard or keypad input via a data entry area 410, key input via one or more selectable buttons or controls 415, voice input via a microphone 418 disposed on the device 400, photographic input via a camera 422 functionality associated with the mobile computing device, or any other suitable input means. Data may be output via the device 400 via any suitable output means, including but not limited to, display on the display screen 405, audible output via an associated speaker 430 or connected earphone system, vibration module for providing tactile output, and the like.

Referring now to FIG. 4B, operational unit 435 is illustrative of internal operating functionality of the mobile computing device 400. A processor 440 is illustrative of a general purpose computer processor for processing incoming and outgoing data and communications and controlling operation of the device and associated software applications via a mobile computing device operating system. Memory 445 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, one or more components of the substitution matching and control system 100 may be stored locally on mobile computing device 400.

Mobile computing device 400 may contain an accelerometer 455 for detecting acceleration, and can be used to sense orientation, vibration, and/or shock. Mobile computing device 400 may contain a global positioning system (GPS) system (e.g., GPS send/receive functionality) 460. A GPS system 460 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 450 include all required functionality, including onboard antennae, for allowing the device 400 to communicate with other communication devices and systems via a wireless network. Radio functions 450 may be utilized to communicate with a wireless or WIFI-based positioning system to determine a device's 400 location.

Figure 5:
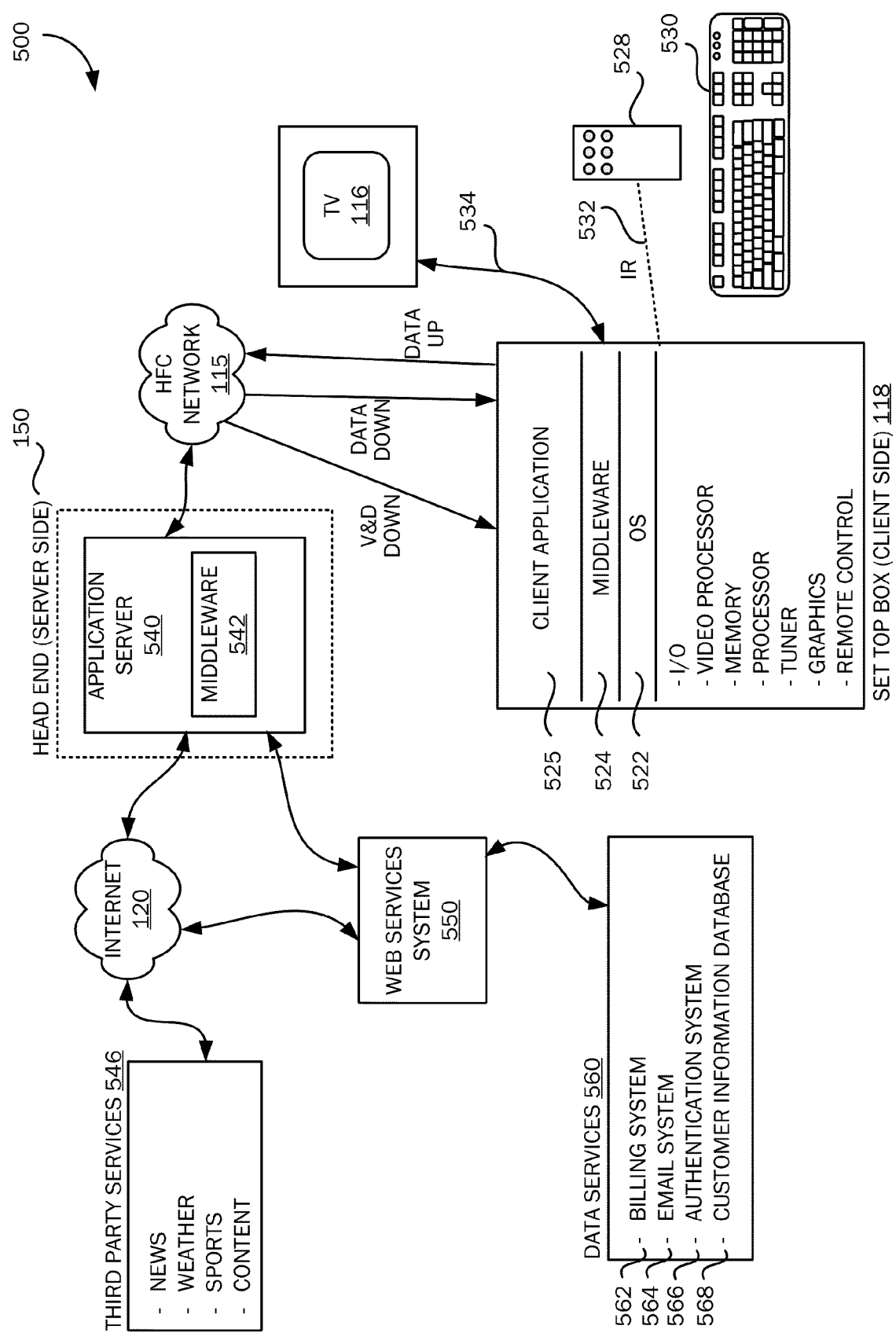
FIG. 5 is a simplified block diagram illustrating a cable television services system architecture providing an operating environment according to an embodiment.

FIG. 5 is a simplified block diagram illustrating a cable television services system 500 (hereafter referred to as "CATV") architecture providing an operating environment according to an embodiment. As can be appreciated, a CATV architecture is but one of various types of systems that may be utilized to provide substituted VOD content. Referring now to FIG. 5, digital and analog video programming, information content and interactive television services are provided via a hybrid fiber coax (HFC) network 115 to a television set 116 for consumption by a cable television/services system customer. As is known to those skilled in the art, HFC networks 115 combine both optical fiber and coaxial cable lines. Typically, optical fiber runs from the cable head end 150 to neighborhoods of subscribers. Coaxial cable runs from the optical fiber feeders to each customer or subscriber. The functionality of the HFC network 115 allows for efficient bidirectional data flow between the client-side set-top box 118 and a server-side application server 540.

The CATV system 500 is in the form of a distributed client-server computing system for providing video and data flow across the HFC network 115 between server-side services providers (e.g., cable television/services providers) via a server-side head end 150 and a client-side customer via a client-side set-top box (STB) 118 functionally connected to a customer receiving device, such as the television set 116. As is understood by those skilled in the art, modern CATV systems 500 may provide a variety of services across the HFC network 115 including traditional digital and analog video programming, telephone services, high speed Internet access, video-on-demand, and information services.

On the client side of the CATV system 500, digital and analog video programming and digital and analog data are provided to the customer television set 116 via the set-top box (STB) 118. interactive television services that allow a customer to input data to the CATV system 500 likewise are provided by the STB 118. As illustrated in FIG. 5, the STB 118 is a multipurpose computing device having a computer processor, memory, and an input/output mechanism. The input/output mechanism receives input from server-side processes via the HFC network 115 and from customers via input devices such as the remote control device 528, keyboard 530, or other computing device, such as a tablet/slate computer 114, smart phone 110, etc. The remote control device 528 and the keyboard 530 may communicate with the STB 118 via a suitable communication transport such as the infrared connection 532. The STB 118 also includes a video processor for processing and providing digital and analog video signaling to the television set 116 via a cable communication transport 534. A multi-channel tuner is provided for processing video and data to and from the STB 118 and the server-side head end system 150, described below.

The STB 118 also includes an operating system 522 for directing the functions of the STB 118 in conjunction with a variety of client applications 525. For example, if a client application 525 requires a news flash from a third-party news source to be displayed on the television 116, the operating system 522 may cause the graphics functionality and video processor of the STB 118, for example, to output the news flash to the television 116 at the direction of the client application 525 responsible for displaying news items. According to embodiments, the operating system 522 may include one or more components of substitution matching and control system 100 as described herein.

Because a variety of different operating systems 522 may be utilized by a variety of different brands and types of set-top boxes, a middleware layer 524 may be provided to allow a given software application to be executed by a variety of different operating systems. According to an embodiment, the middleware layer 524 may include a set of application programming interfaces (APIs) that are exposed to client applications 525 and operating systems 522 that allow the client applications to communicate with the operating systems through common data calls understood via the API set. As described below, a corresponding middleware layer is included on the server side of the CATV system 500 for facilitating communication between the server-side application server and the client-side STB 118. The middleware layer 542 of the server-side application server and the middleware layer 524 of the client-side STB 118 may format data passed between the client side and server side according to the Extensible Markup Language (XML).

According to one embodiment, the set-top box 118 passes digital and analog video and data signaling to the television 116 via a one-way communication transport 534. According to other embodiments, two-way communication transports may be utilized, for example, via high definition multimedia (HDMI) ports. The STB 118 may receive video and data from the server side of the CATV system 500 via the HFC network 115 through a video/data downlink and data via a data downlink. The STB 118 may transmit data from the client side of the CATV system 500 to the server side of the CATV system 500 via the HFC network 115 via one data uplink. The video/data downlink is an "in band" downlink that allows for digital and analog video and data signaling from the server side of the CATV system 500 through the HFC network 115 to the set-top box 118 for use by the STB 118 and for distribution to the television set 116. As is understood by those skilled in the art, the "in band" signaling space operates at a relative high frequency, e.g., between 54 and 400 megahertz. The signaling space is generally divided into 6 megahertz channels in which may be transmitted as a single analog signal or a greater number (e.g., ten) of digital signals.

The data downlink and the data uplink, illustrated in FIG. 5, between the HFC network 115 and the set-top box 118 comprise "out of band" data links. As is understand by those skilled in the art, the "out of band" frequency range is generally at a lower frequency than "in band" signaling. For example, the "out of band" frequency range may be between zero and 54 megahertz. Data flow between the client-side set-top box 118 and the server-side application server 540 is typically passed through the "out of band" data links. Alternatively, an "in band" data carousel may be positioned in an "in band" channel into which a data feed may be processed from the server-side application server 540 through the HFC network 115 to the client-side STB 118. Operation of data transport between components of the CATV system 500, described with reference to FIG. 5, is well known to those skilled in the art.

Referring still to FIG. 5, the head end 150 of the CATV system 500 is positioned on the server side of the CATV system and includes hardware and software systems responsible for originating and managing content for distributing through the HFC network 115 to client-side STBs 118 for presentation to customers via televisions 116. As described above, a number of services may be provided by the CATV system 500, including digital and analog video programming, interactive television services, telephone services, video-on-demand services, targeted advertising, and provision of information content.

The application server 540 is a general-purpose computing system operative to assemble and manage data sent to and received from the client-side set-top box 118 via the HFC network 115. As described above with reference to the set-top box 118, the application server 540 includes a middleware layer 542 for processing and preparing data from the head end of the CATV system 500 for receipt and use by the client-side set-top box 518. For example, the application server 540 via the middleware layer 542 may obtain data from third-party services 546 via the Internet 120 for transmitting to a customer through the HFC network 115 and the set-top box 118. For example, content metadata a third-party content provider service may be downloaded by the application server via the Internet 120. When the application server 540 receives the downloaded content metadata, the middleware layer 542 may be utilized to format the content metadata for receipt and use by the set-top box 118. Therefore, content metadata may be sent and categorized based on the availability to the customer's program guide data.

According to one embodiment, data obtained and managed by the middleware layer 542 of the application server 540 is formatted according to the Extensible Markup Language and is passed to the set-top box 118 through the HFC network 115 where the XML-formatted data may be utilized by a client application 525 in concert with the middleware layer 524, as described above. As should be appreciated by those skilled in the art, a variety of third-party services data, including news data, weather data, sports data and other information content may be obtained by the application server 540 via distributed computing environments such as the Internet 120 for provision to customers via the HFC network 115 and the set-top box 118.

According to embodiments, the application server 540 obtains customer support services data, including billing data, information on customer work order status, answers to frequently asked questions, services provider contact information, and the like from data services 560 for provision to the customer via an interactive television session. As illustrated in FIG. 5, the services provider data services 560 include a number of services operated by the services provider of the CATV system 500 which may include data on a given customer.

A billing system 562 may include information such as a customer's name, street address, business identification number, Social Security number, credit history, and information regarding services and products subscribed to by the customer. According to embodiments, the billing system 562 may also include billing data for services and products subscribed to by the customer for bill processing, billing presentment and payment receipt.

A customer information database 568 may include general information about customers such as place of employment, business address, business telephone number, and demographic information such as age, gender, educational level, and the like. The customer information database 568 may also include information on pending work orders for services or products ordered by the customer. The customer information database 568 may also include general customer information such as answers to frequently asked customer questions and contact information for various service provider offices/departments. As should be understood, this information may be stored in a variety of disparate databases operated by the cable services provider.

Referring still to FIG. 5, web services system 550 is illustrated between the application server 540 and the data services 560. According to embodiments, web services system 550 serves as a collection point for data requested from each of the disparate data services systems comprising the data services 560. According to embodiments, when the application server 540 requires customer services data from one or more of the data services 560, the application server 540 passes a data query to the web services system 550. The web services system formulates a data query to each of the available data services systems for obtaining any required data for a requesting customer as identified by a set-top box identification associated with the customer. The web services system 550 serves as an abstraction layer between the various data services systems and the application server 540. That is, the application server 540 is not required to communicate with the disparate data services systems, nor is the application server 540 required to understand the data structures or data types utilized by the disparate data services systems. The web services system 550 is operative to communicate with each of the disparate data services systems for obtaining necessary customer data. The customer data obtained by the web services system is assembled and is returned to the application server 540 for ultimate processing via the middleware layer 542, as described above.

An authentication system 566 may include information such as secure user names, subscriber profiles, subscriber IDs, and passwords utilized by customers for access to network services. As should be understood by those skilled in the art, the disparate systems 562, 564, 566, 568 may be integrated or provided in any combination of separate systems, wherein FIG. 5 shows only one example.

Embodiments the invention may be used in combination with any number of computer systems, such as in desktop environments, laptop or notebook computer systems, multi-processor systems, micro-processor based or programmable consumer electronics, networked PCs, mini computers, main frame computers, mobile communication device systems and the like. Embodiments of the present invention may be utilized in various distributed computing environments where tasks are performed by remote processing devices that are linked through a communications network in a distributed computing environment, and where programs may be located in both local and remote memory storage.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. Although embodiments of the present invention have been described with reference to particular standards and protocols, the present invention is not limited to such standards and protocols.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method for playing a video content item from a video on demand platform instead of from a digital video recorder, the method comprising:
   identifying a video content item to be recorded onto a digital video recorder;
   querying a listing of video content items available from a video on demand platform;
   determining whether the identified video content item matches a video content item found in the listing and whether the video content item is available on the video on demand platform;
   if no match is found, or if a match is found prior to the matched video content item being available on the video on demand platform:
      determining whether the identified video content item is already recorded on the digital video recorder;
      if the identified video content item is not yet recorded on the digital video recorder, recording the identified video content item onto the digital video recorder;
      upon receiving a request to play the identified video content item, providing playback of the recorded identified video content item from the digital video recorder or from an alternate device;
   if a match is found and if matched video on demand content item is available on the video on demand platform:
      creating a record that the identified video content is to be played from the video on demand platform;
      upon receiving a request to play the identified video content item, providing playback of the matched video content item from the video on demand platform, wherein playback is provided on the digital video recorder or on an alternate device; and if the identified video content item subsequently becomes available on the video on demand platform:
creating a record that the identified video content is to be played from the video on demand platform; and
deleting the identified video content recording from the digital video recorder and providing playback of the identified video content from the video on demand platform.

2. The method of claim 1, further comprising:
receiving an indication of a selection to play a video content item recorded onto the digital video recorder;
determining whether a record exists indicating the video content item is to be played from the video on demand platform; and, if so,
playing the selected video content item from the video on demand platform.

3. The method of claim 2, wherein receiving an indication of a selection to play the video content item recorded onto the digital video recorder comprises receiving an indication of a selection to play the video content item from one or more of:
a set top box;
a mobile phone;
a computer;
a tablet computing device; or
an Internet-connected device.

4. The method of claim 1, further comprising creating a record that the video content item recorded onto the digital video recorder is to be played from the video on demand content platform.

5. The method of claim 1, further comprising providing a listing of the video on demand content items recorded onto the digital video recorder in a digital video recorder menu of recorded content items.

6. The method of claim 1, further comprising making a determination as to whether to play the identified video content item from the video on demand platform or from the digital video recorder, wherein making the determination comprises one or more of:
applying rules based on user behavior;
applying rules based on user configuration; or
prompting a user and receiving a response.

7. The method of claim 1, wherein querying a list of video on demand content items comprises querying a list of video content items stored in a VOD library and video content items scheduled to be added to a VOD library.

8. The method of claim 1, further comprising, in response to providing playback of the matched video content item from the video on demand platform, inserting advertising into the video on demand content item at the time of playback.

9. The method of claim 1, wherein if the identified video content item is known to be available from the video on demand platform within a day, delay creating a record that the identified video content item is to be played from the video on demand platform until the identified video content item is available from the video on demand platform.

10. A system for playing a video content item from a video on demand platform instead of from a digital video recorder, the system comprising:
a memory storage; and
a processing unit coupled to the memory storage, wherein the processing unit is operable to:
identify a video content item to be recorded onto a digital video recorder;
query a listing of video content items available from a video on demand platform;
determine whether the identified video content item matches a video on demand content item found on the listing and whether the video on demand content item is available on the video on demand platform;
if no match is found, or if a match is found prior to the matched video content item being available on the video on demand platform:
determine whether the identified video content item is already recorded on the digital video recorder;
if the identified video content item is not yet recorded on the digital video recorder, record the identified video content item onto the digital video recorder;
upon receiving a request to play the identified video content item, provide playback of the recorded identified video content item from the digital video recorder or from an alternate device;
if a match is found and if matched video on demand content item is available on the video on demand platform:
create a record that the identified video content is to be played from the video on demand platform;
upon receiving a request to play the identified video content item, provide playback of the matched video content item from the video on demand platform,
wherein playback is provided on the digital video recorder or on an alternate device; and
if the identified video content item subsequently becomes available on the video on demand platform:
create a record that the identified video content is to be played from the video on demand platform; and
delete the identified video content recording from the digital video recorder and provide playback of the identified video content from the video on demand platform.

11. The system of claim 10, wherein the processing unit is further operable to:
receive an indication of a selection to play a video content item recorded onto a digital video recorder;
determine whether a record exists indicating the video content item is to be played from the video on demand platform; and, if so,
play the selected video content item from the video on demand platform.

12. The system of claim 10, wherein the processing unit is further operable to create a record that the video content item to be recorded onto the digital video recorder is to be played from the video on demand content platform.

13. The system of claim 10, wherein the processing unit is further operable to provide a listing of the video on demand content items to be recorded onto the digital video recorder in a digital video recorder menu of recorded content items.

14. The system of claim 10, wherein the processing unit is further operable to make a determination as to whether to play the identified video content item from the video on demand platform or from the digital video recorder, the determination based on one or more of:
applying rules based on user behavior;
applying rules based on user configuration; or
prompting a user and receiving a response.

15. The system of claim 10, wherein if the identified video content item is known to be available from the video on demand platform within a day, delay creating a record that the identified video content item is to be played from the video on demand platform until the identified video content item is available from the video on demand platform.

16. A computer-readable storage device which stores a set of instructions which when executed performs a method for playing a video content item from a video on demand platform instead of from a digital video recorder, the method executed by the set of instructions comprising:

identifying a video content item to be recorded onto a digital video recorder;

querying a listing of video content items available from a video on demand platform; abstract, determining whether the identified video content item matches a video content item found in the listing and whether the video content item is available on the video on demand platform;

if no match is found, or if a match is found prior to the matched video content item being available on the video on demand platform:

determining whether the identified video content item is already recorded on the digital video recorder;

if the identified video content item is not yet recorded on the digital video recorder, recording the identified video content item onto the digital video recorder;

upon receiving a request to play the identified video content item, providing playback of the recorded identified video content item from the digital video recorder or from an alternate device;

if a match is found and if matched video on demand content item is available on the video on demand platform:

creating a record that the identified video content is to be played from the video on demand platform;

upon receiving a request to play the identified video content item, providing playback of the matched video content item from the video on demand platform, wherein playback is provided on the digital video recorder or on an alternate device; and if the identified video content item subsequently becomes available on the video on demand platform:

creating a record that the identified video content is to be played from the video on demand platform; and deleting the identified video content recording from the digital video recorder and providing playback of the identified video content from the video on demand platform.

17. The computer-readable storage device of claim 16, the method further comprising:

receiving an indication of a selection to play a video content item recorded onto the digital video recorder;

determining whether a record exists indicating the video content item is to be played from the video on demand platform; and, if so, playing the selected video content item from the video on demand platform.

18. The computer-readable storage device of claim 17, wherein receiving an indication of a selection to play the video content item recorded onto the digital video recorder comprises receiving an indication of a selection to play the video content item from one or more of:

a set top box;
a mobile phone;
a computer;
a tablet computing device; or
an Internet-connected device.

19. The computer-readable storage device of claim 16, further comprising making a determination as to whether to play the identified video content item from the video on demand platform or from the digital video recorder, wherein making the determination comprises one or more of:

applying rules based on user behavior;
applying rules based on user configuration; or
prompting a user and receiving a response.

20. The computer-readable storage device of claim 16, wherein if the identified video content item is known to be available from the video on demand platform within a day, delay creating a record that the identified video content item is to be played from the video on demand platform until the identified video content item is available from the video on demand platform.

* * * * *